2,841,592

PROCESS FOR PRODUCING α-ALKOXYBENZYL-SUCCINIC ANHYDRIDES AND NUCLEARLY SUBSTITUTED BENZYL DERIVATIVES THEREOF

Raymond I. Longley, Jr., Springfield, and Tracy M. Patrick, Jr., Marblehead Neck, Mass., assignors to Monsanto Chemical Company, St. Louis, Mo., a corporation of Delaware No Drawing. Application June 23, 1953
Serial No. 363,680

11 Claims. (Cl. 260—346.8)

This invention relates to the process of producing α-alkoxybenzylsuccinic anhydrides and nuclearly substituted benzyl derivatives thereof by the reaction of a benzyl alkyl ether with maleic anhydride in the presence of a free-radical-promoting catalyst.

More specifically, the process of this invention comprises the reaction of 1 mole of maleic anhydride with 1 mole of a benzyl alkyl ether, and the molar ratio of the said ether to the maleic anhydride at the inception of the reaction is from about 1:1 to about 10:1, in the presence of from about 0.5 to about 10 mole percent, based on the maleic anhydride, of a free-radical-promoting catalyst, at a temperature such that the free-radical-promoting catalyst is decomposed at a moderate rate during the course of the reaction.

The novel reaction can be diagrammatically shown as follows:

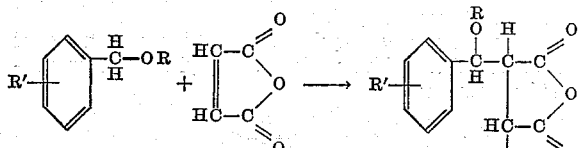

wherein R is an alkyl group, preferably containing up to 8 carbon atoms and R' is selected from the group consisting of hydrogen, chlorine, and methyl, ethyl, methoxy and ethoxy radicals.

The preferred free-radical-promoting catalysts are, for example; organic peroxides, such as benzoyl peroxide, acetyl peroxide, t-butyl peroxide, lauroyl peroxide, stearoyl peroxide, t-butyl hydroperoxide, and mixed peroxides such as acetyl benzoyl peroxide; inorganic peroxides, such as, hydrogen peroxide and sodium peroxide; peroxy acids, such as, peracetic acid; alkali peroxy acid salts, such as, sodium perborate, potassium persulfate, sodium percarbonate; and the like. The aforesaid catalysts contain the common structure of an oxygen-oxygen linkage and are members of the class of compounds generically known as peroxygen or peroxidic catalysts. The free-radical promoting catalyst is generally employed at from about 0.5 to about 10 mole percent and preferably from about 2 to about 5 mole percent based on the maleic anhydride. The catalyst can be added all at once, in increments, or continuously over a period of time. In general the organic peroxides are the more preferred catalysts and benzoyl peroxide is especially preferred.

The temperature at which the reaction is maintained is not critical. The temperature can range from —50° C. to the decomposition point of the reactants but the range of from about 25% C. to about 150° C. is preferred. In general the temperature should be selected such that the free-radical-promoting catalyst is decomposed at a moderate rate during the course of the reaction, for example, if benzoyl peroxide is the free-radical-promoting catalyst a temperature in the range of from about 70° C. to about 90° C. is preferred.

The mole ratio of the benzyl alkyl ether to the maleic anhydride can be varied over a considerable range such as from about 1:1 to about 10:1 and preferably ranges from about 2:1 to about 4:1 at the initiation of the reaction.

The following examples are illustrative of the invention.

Example 1

A mixture of 146.4 g. (1.2 moles) of benzyl methyl ether, 39.2 g. (0.4 mole) of maleic anhydride, and 2.0 g. of benzoyl peroxide was placed in a jacketed reaction flask containing benzene in the jacket as the heat transfer medium. The benzene was brought to reflux and after about 2 hours an additional 0.5 g. of benzoyl peroxide was added to the reaction mixture. The reaction was terminated after about 8 hours at which time the reaction mixture was a dark red-amber liquid.

The reaction mixture was transferred to a Claisen flask and distilled therefrom recovering about 103 g. of the benzyl methyl ether and a portion of the maleic anhydride. A crude conversion of about 60 percent and a crude yield of about 84 percent of a pale yellow, extremely viscous liquid reaction product was obtained in addition to a small amount of a clear brown liquid residue.

The reaction product was redistilled through a Vigreux fractionating column to obtain a practically water-white, extremely viscous liquid which had a boiling point of from 144 to 146° C. at 0.8 mm. of mercury and the refractive index at 25° C. was 1.5261. The aforesaid liquid product slowly crystallized to a waxy white solid. A portion of the waxy white solid was recrystallized from absolute ethyl ether and found to have a melting point of from about 88 to 94° C. The product was identified as α-methoxybenzylsuccinic anhydride.

A sample of the α-methoxybenzylsuccinic anhydride was dissolved in a warm sodium carbonate solution and precipitated with hydrochloric acid to yield a white solid which was recrystallized twice from water to yield a white solid having a melting point of 143° C. The acid was identified as α-methoxybenzylsuccinic acid.

Calculated for $C_{12}H_{14}O_5$: C, 60.49; H, 5.92; NE, 119.
Found: C, 60.44; H, 5.97; NE, 120.

Example 2

To show that the process of Example 1 is a free-radical reaction the experiment was repeated with the exception that 0.2 g. of hydroquinone and 1.0 g. of benzoic acid replaced the benzoyl peroxide. After an 8-hour reaction period the mixture was distilled through a Vigreux fractionating column and about 98 percent of the starting materials were recovered, conclusively proving the process to be a free-radical promoted reaction.

Example 3

In a similar manner to Example 1, 103.2 g. (0.847 mole) of benzyl methyl ether, 40.6 g. (0.282 mole) of dimethyl maleate and 2.0 g. of benzoyl peroxide were added to the jacketed flask containing refluxing benzene and heated for 24 hours. The mixture was then distilled through a Vigreux fractionating column thereby recovering about 97 percent of the reactants and the residue was negligible. Accordingly, no reaction took place.

In addition benzyl chloride and benzyl cyanide were found to be non-reactive with maleic anhydride under conditions similar to those of Example 1.

Example 4

To prepare α-methoxy-p-chlorobenzylsuccinic anhydride a mixture of 188 g. (1.2 moles) of p-chlorobenzyl methyl ether, 29.4 g. (0.3 mole) of maleic anhydride, and 2.0 g. of benzoyl peroxide is placed in the jacketed reaction flask of Example 1 and the benzene brought to reflux and maintained thereat for about 12 hours. The reaction mixture is then separated by fractional distillation recovering the unconverted reactants and the product, α-methoxy-p-chlorobenzylsuccinic anhydride, in a similar manner to the procedure of Example 1.

*Example 5*

To prepare α-ethoxy-o-methoxybenzylsuccinic anhydride a mixture of 133 g. (0.8 mole) of o-methoxybenzyl ethyl ether, 39.2 g. (0.4 mole) of maleic anhydride, and 3.0 g. of benzoyl peroxide is placed in the jacketed reaction flask of Example 1 and heated by means of the refluxing benzene for about 10 hours. Then the reaction mixture is separated by fractional distillation in a similar manner to Example 1 and the aforementioned product recovered.

*Example 6*

In a similar manner to the above examples the alkyl nuclearly substituted benzyl akyl ether-maleic anhydride adducts are produced as follows:

A mixture of 136 g. (1.0 mole) of p-methylbenzyl methyl ether, 29.4 g. (0.3 mole) of maleic anhydride, and 2.0 g. of benzoyl peroxide is reacted by confining the said mixture to a jacketed vessel, similarly to Example 1, and maintaining the benzene at reflux for about 8 hours. The α-methoxy-p-methylbenzylsuccinic anhydride is obtained after recovering the unconverted reactants by fractional distillation.

Homologous compounds to α-methoxybenzylsuccinic anhydride can be prepared in a similar manner to Example 1, as for example, benzyl ethyl ether with maleic anhydride yields α-ethoxybenzylsuccinic anhydride, benzyl propyl ether with maleic anhydride yields αpropoxybenzylsuccinic anhydride, benzyl isopropyl ether with maleic anhydride yields α-isopropoxybenzylsuccinic anhydride, benzyl butyl ether with maleic anhydride yields α-butoxybenzylsuccinic anhydride, benzyl hexyl ether with maleic anhydride yields α-hexoxybenzylsuccinic anhydride, benzyl octyl ether with maleic anhydride yields α-octoxybenzylsuccinic anhydride, benzyl 2-ethylhexyl ether with maleic anhydride yields α-(2-ethylhexoxy)benzylsuccinic anhydride, m-ethylbenzyl butyl ether with maleic anhydride yields α-butoxy-m-ethylbenzylsuccinic anhydride, and analogous nuclearly substituted chlorine and alkoxy benzyl derivatives can be prepared similarly to Examples 1, 4, 5 and 6, as for example, o-chlrobenzyl propyl ether with maleic anhydride yields α - propoxy - o - chlorobenzylsuccinic anhydride, p-chlorobenzyl hexyl ether with maleic anhydride yields α-hexoxy-p-chlorobenzylsuccinic anhydride, p-methoxybenzyl methyl ether with maleic anhydride yields α-methoxy-p-methoxybenzylsuccinic anhydride, o-ethoxybenzyl isopropyl ether with maleic anhydride yields α-isopropoxy-o-ethoxybenzylsuccinic anhydride, and the like.

From the foregoing examples it is readily seen that the process of this invention is specific to the benzyl alkyl ethers and maleic anhydride, since closely analogous compounds are shown to be inoperative. The inoperativeness of closely analogous compounds also clearly indicates the hazard of attempting to predict free-radical induced reactions by analogy.

The α-alkoxybenzylsuccinic anhydrides and nuclearly substituted benzyl derivatives thereof are useful intermediates for the preparation of plasticizers, pesticides, surface-coating composition, and adhesives. Thus, for example, the aforementioned anhydrides can be converted to the corresponding dicarboxylic acids and esterified with intermediate molecular weight monohydric alcohols, e. g., alcohols from the class R″OH, wherein R″ is an alkyl radical containing from about 6 to about 12 carbon atoms, or R″ is an aromatic radical free from nonbenzenoid unsaturation containing from about 6 to about 10 carbon atoms, or mixtures thereof and the like, which esterified compositions are useful as plasticizers for various high molecular weight compositions, e. g., vinyl polymers such as polyvinyl chloride and the like. The anhydrides and dicarboxylic acids thereof also can be esterified with polyhydric alcohols to produce alkyd resins which are useful as surface-coating compositions and adhesives.

This application is a continuation-in-part of our application Serial No. 237,304, filed July 17, 1951, now abandoned.

We claim:

1. The process comprising the reaction of 1 mole of maleic anhydride with 1 mole of a benzyl alkyl ether having the formula:

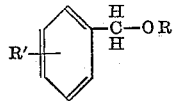

wherein R is an alkyl radical having up to 8 carbon atoms and R′ is selected from the group consisting of hydrogen, chlorine, and methyl, ethyl, methoxy and ethoxy radicals, and the molar ratio of the said ether to the maleic anhydride at the inception of the reaction is from about 1:1 to about 10:1, in the presence of from about 0.5 to about 10 mole percent, based on the maleic anhydride, of a peroxygen catalyst selected from the group consisting of benzoyl peroxide, acetyl peroxide, t-butyl peroxide, lauroyl peroxide, stearoyl peroxide, t-butyl hydroperoxide, acetyl benzoyl peroxide, hydrogen peroxide, sodium peroxide, peracetic acid, sodium perborate, potassium persulfate, and sodium percarbonate, at a temperature of from about 25° C. to about 150° C. selected such that the peroxygen catalyst is decomposed at a moderate rate during the course of the reaction.

2. The process of claim 1, wherein the peroxygen catalyst is an organic peroxide.

3. The process comprising the reaction of 1 mole of maleic anhydride with 1 mole of a benzyl alkyl ether, having the formula:

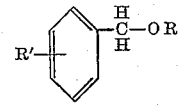

wherein R is an alkyl radical having up to 8 carbon atoms and R′ is selected from the group consisting of hydrogen, chlorine, and methyl, ethyl, methoxy and ethoxy radicals, and the molar ratio of the said ether to the maleic anhydride at the inception of the reaction is from about 1:1 to about 10:1, in the presence of from about 0.5 to about 10 mole percent, based on the maleic anhydride, of benzoyl peroxide at a temperature from about 70 to about 90° C.

4. The process of claim 3, wherein the ether is benzyl methyl ether.

5. The process of claim 3, wherein the ether is benzyl ethyl ether.

6. The process of claim 3, wherein the ether is benzyl isopropyl ether.

7. The process of claim 3, wherein the ether is p-methylbenzyl methyl ether.

8. The process of claim 3, wherein the ether is p-chlorobenzyl methyl ether.

9. The process comprising the reaction of 1 mole of maleic anhydride with 1 mole of a benzyl alkyl ether, having the formula

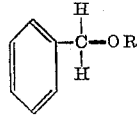

wherein R is an alkyl radical containing up to 8 carbon atoms, and the molar ratio of the said ether to the maleic anhydride at the inception of the reaction is from about 1:1 to about 10:1, in the presence of from about 0.5 to about 10 mole percent, based on the maleic anhydride, of a peroxygen catalyst selected from the group consisting of benzoyl peroxide, acetyl peroxide, t-butyl peroxide, lauroyl peroxide, stearoyl peroxide, t-butyl hydroperoxide, acetyl benzoyl peroxide, hydrogen peroxide, sodium peroxide, peracetic acid, sodium perborate, potassium persulfate, and sodium percarbonate, at a temperature of from about 25° C. to about 150° C. selected such that the peroxygen catalyst is decomposed at a moderate rate during the course of the reaction.

10. The process comprising the reaction of 1 mole of maleic anhydride with 1 mole of a benzyl alkyl ether, having the formula

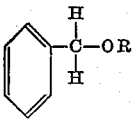

wherein R is an alkyl radical containing up to 8 carbon atoms, and the molar ratio of the said either to the maleic anhydride at the inception of the reaction is from about 1:1 to about 10:1, in the presence of from about 0.5 to about 10 mole percent, based on the maleic anhydride, of benzoyl peroxide at a temperature from about 70 to about 90° C.

11. The process comprising the reaction of 1 mole of maleic anhydride with 1 mole of a benzyl alkyl ether, having the formula

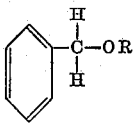

wherein R is an alkyl radical containing up to 8 carbon atoms, and the molar ratio of the said ether to the maleic anhydride at the inception of the reaction is from about 2:1 to 4:1, in the presence of from about 2 to about 5 mole percent, based on the maleic anhydride, of benzoyl peroxide at a temperature from about 70 to about 90° C.

References Cited in the file of this patent
UNITED STATES PATENTS

| | | |
|---|---|---|
| 2,047,398 | Voss et al. | July 14, 1936 |
| 2,121,183 | Binapfl | June 21, 1938 |
| 2,286,062 | Condo et al. | June 9, 1942 |
| 2,383,399 | Lundquist | Aug. 21, 1945 |

FOREIGN PATENTS

| | | |
|---|---|---|
| 668,574 | Great Britain | Mar. 19, 1952 |

(Corresponding U. S. Patent #2,692,270, Oct. 19, 1954)